(12) United States Patent
Kitamura et al.

(10) Patent No.: US 6,878,094 B2
(45) Date of Patent: Apr. 12, 2005

(54) POWER TRANSMISSION CONTROL DEVICE FOR VEHICLE

(75) Inventors: Yutaka Kitamura, Tokyo (JP);
Kazuhiro Odahara, Tokyo (JP);
Shigeru Shiroyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 21 days.

(21) Appl. No.: 10/424,773

(22) Filed: Apr. 29, 2003

(65) Prior Publication Data

US 2003/0224903 A1 Dec. 4, 2003

(30) Foreign Application Priority Data

Jun. 4, 2002 (JP) .................................... P2002-163238

(51) Int. Cl.[7] ............................ B60K 41/02; F16H 3/72
(52) U.S. Cl. ............................................. 477/5; 475/5
(58) Field of Search ......................... 180/65.3–65.4, 180/65.2; 477/5, 3, 97, 98, 115, 167; 475/5

(56) References Cited

U.S. PATENT DOCUMENTS

| 4,870,875 | A | | 10/1989 | Morishita |
| 5,842,944 | A | * | 12/1998 | Morishita et al. ............ 475/154 |
| 6,048,288 | A | * | 4/2000 | Tsujii et al. .................... 477/5 |
| 6,203,468 | B1 | * | 3/2001 | Nitta et al. ..................... 477/5 |
| 6,234,769 | B1 | * | 5/2001 | Sakai et al. .................. 417/374 |
| 6,250,276 | B1 | * | 6/2001 | Boll ........................ 123/198 R |
| 6,425,838 | B1 | * | 7/2002 | Matsubara et al. ............. 475/5 |
| 6,609,992 | B2 | * | 8/2003 | Kusumoto et al. ........... 475/318 |
| 2002/0117860 | A1 | * | 8/2002 | Man et al. ...................... 475/5 |
| 2003/0104900 | A1 | * | 6/2003 | Takahashi et al. .............. 477/3 |

FOREIGN PATENT DOCUMENTS

| DE | 199 41 705 A | 3/2000 |
| EP | 0 916 546 A | 5/1999 |

\* cited by examiner

Primary Examiner—Roger Pang
(74) Attorney, Agent, or Firm—Sughrue Mion, PLLC

(57) ABSTRACT

A power transmission control device for vehicle controls switching between a speed increasing mode and a constant speed mode on the basis of electrical load, battery or the like, and shock due to switching is less. The power transmission control device includes: an electric rotating machine 5; a crank pulley 15; a planetary gear mechanism consisting of a sun gear 18, a planetary gear 19 and an internal gear 20; and controller 70 for controlling an electromagnetic clutch 21. The electromagnetic clutch 21 is ON to operate the planetary gear mechanism as a speed increasing mechanism and drive the electric rotating machine 5 at an increasing speed, when engine speed of the internal combustion engine 1 is not higher than a predetermined value, remaining capacity of the battery 9 is not more than a predetermined level or electrical load is in a high-load state.

20 Claims, 6 Drawing Sheets

POWER TRANSMISSION CONTROL DEVICE FOR VEHICLE

BACKGROUND OF THE INVENTION

1. Field of the Invention

The present invention relates to a power transmission control device for vehicle capable of controlling a change gear ratio when an internal combustion engine is started with an electric rotating machine acting as a start-up motor and when the electric rotating machine acting as an alternator or auxiliary machines are driven from the internal combustion engine.

2. Description of the Related Art

Auxiliary machines such as compressor or oil pump, charging generator (alternator) and the like are mounted on a vehicle driven by an internal combustion engine and the internal combustion engine drives these auxiliary machines. FIG. 6 shows a prior art of a drive of these auxiliary machines, and is a cross sectional view showing a technique disclosed in the Japanese Patent Publication (examined) No. 58069/1994.

This auxiliary machine drive includes a disk-shaped carrier 102 accommodated in an internal part of a housing 101, and an input shaft 103 rotatably supported on the housing 101 is formed integrally with this carrier 102. Furthermore, a plurality of arms 102a are protruded on a surface opposite to the input shaft 103 of the carrier 102, and a planetary gear 104 is mounted rotatably on each arm 102a. The planetary gear 104 is engaged with an internal gear 105 on the outer circumferential side, and with a sun gear 106 on the inside perimeter side with respect to the input shaft 103. The planetary gear 104, the internal gear 105 and the sun gear 106 form a planetary gear mechanism, and the internal gear 105 is rotatably supported on the housing 101 on the circumferential side through bearings 107a and 107b.

The sun gear 106 is formed on an output shaft 110 in such a manner that one end is rotatably journaled on the carrier 102 integrated with the input shaft 103 via a bearing 108, and the other end is rotatably journaled on the housing 101 via a bearing 109. A pulley 111 for driving the auxiliary machine is put over the output shaft 110. Further, a semple plunger 112 is provided on a circumference of the carrier 102 in such a manner as to be protruding in radial direction. The semple plunger 112 is constructed so as to protrude from the carrier 102 due to a centrifugal force thereby fixing the carrier 102 and the internal gear 105 when a rotational speed of the carrier 102 exceeds a predetermined level. An electromagnetic clutch 113 is provided at one end face of the internal gear 105. This electromagnetic clutch 113 consists of an umbrella-shaped spring 113a provided on a side surface of the internal gear 105, a ring-shaped armature 113b fixed to a larger diameter portion of the spring 113a, and a core 113d that is disposed opposite to the armature 113b and provided with an exciting coil 113c.

In the conventional auxiliary machine drive of above construction, when the input shaft 103 is driven from an internal combustion engine to rotate, the planetary gear 106 revolves round the sun gear 106 that is supported on the arm 102b provided at the carrier 102 formed integrally with the input shaft 103. At this time, an ON state of the electromagnetic clutch 113 causes the armature 113b of the electromagnetic clutch 113 to be attracted to and constrained by the core 113d against the spring 113a. Accordingly, the internal gear 105, which is connected to the armature 113b via the spring 113a, is also in a stationary state. Therefore, the sun gear 106 rotates at an increasing speed compared with a rotational speed of the input shaft 103, and the output shaft 110 on which the sun gear 106 is formed, comes to rotate at a high speed compared with the input shaft 103.

When increasing an engine speed of the internal combustion engine, and a rotational speed of the carrier 102 comes to be not less than a predetermined value, the semple plunger 112, which is provided on the circumferential portion of the carrier 102, protrudes in radial direction due to a centrifugal force, and is engaged with the internal gear 105 resulting in connection between the carrier 102 and the internal gear 105. Furthermore, when a rotational speed of the carrier comes to be not less than a predetermined value, control means, not shown, causes the electromagnetic clutch 113 to be in an OFF state, and releases constraint of the internal gear 105. Therefore, the internal gear 105 comes to rotate integrally with the carrier 102, that is, the input shaft 103, and the sun gear 106 also operates at the same rotational speed as that of the carrier 102 to prevent the output shaft 104 and the auxiliary machine from over-rotation. In this manner, this mechanism prevents the output shaft 104 and auxiliary machine from being damaged due to any excessive centrifugal force, and prevents bearings and the like from being damaged due to over-rotation.

Since the conventional auxiliary machine drive is constituted as described above, a problem exits in that switching between a speed increasing mode and a constant speed mode is not smooth. Specifically, the auxiliary machine is arranged such that the semple plunger 112 protrudes owing to a centrifugal force to be engaged with the internal gear 105 thereby providing connection between the carrier 102 and the internal gear 105. Accordingly, shock at the time of switching is large, this shock is transmitted to the internal combustion engine via the input shaft 103, and any rotational fluctuation is brought about to the internal combustion engine. As a result, a problem in vehicle drivability comes out.

Moreover, switching between a speed increasing mode and a constant speed mode is determined primarily depending on a centrifugal force exerting on the semple plunger 112, i.e., an engine speed of the internal combustion engine. Therefore, in the case of controlling the charging generator for increasing speed, another problem exists in that conditions of electrical loads or a remaining capacity of a battery is not involved. A further problem exists in that switching cannot be carried out under optimum conditions utilizing various signal data such as cooling water temperature of the internal combustion engine, vehicle velocity, and shift position location.

SUMMARY OF THE INVENTION

Accordingly, it is an object of the present invention to provide a power transmission control device for vehicle capable of absorbing shock at the time of switching between a speed increasing mode and a constant speed mode, and optimally controlling the switching between the speed increasing mode and the constant speed mode depending on conditions of an electrical load or battery, and cooling water temperature, vehicle speed, shift position, etc.

To accomplish the foregoing object, a power transmission control device for vehicle according to the invention includes: an electric rotating machine that is mounted on an internal combustion engine and functions as an electric motor and a generator; a crank pulley that is mounted on a crankshaft of the internal combustion engine and drives the electric rotating machine by power transmission means; a planetary gear mechanism consisting of a sun gear coupled to the crank pulley, a planetary gear supported on a carrier coupled to the crankshaft, and an internal gear controlled to be either a constraint state or a non-constraint state by means of an electromagnetic clutch; and control means that controls the electric rotating machine and the electromagnetic clutch. In the mentioned power transmission control device for vehicle, at the time of starting the internal combustion engine, the control means turns the electromagnetic clutch ON thereby causing the planetary gear mechanism to function as a reduction mechanism, and drives the internal combustion engine using the electric rotating machine as an electric motor; and after the internal combustion engine has been started, when the internal combustion engine is in a state of being not higher than a predetermined engine speed and, furthermore, a remaining capacity of a battery, which is electrically supplied from the electric rotating machine, is not more than a predetermined level or an electrical load is in a high-load state, the control means causes the planetary gear mechanism to function as a speed increasing mechanism by maintaining the ON state of the electromagnetic clutch, and drives the electric rotating machine acting as a generator at an increasing speed.

As a result of the mentioned construction, when it is necessary to supply an electric power to a large-capacity load or to rapidly charge the battery falling in an over-discharge state within a range of low speed of the internal combustion engine after the starting thereof, it is possible to generate an electric power of a high output by operating the electric rotating machine at an increasing speed, thereby enabling to meet a large-capacity load with a relatively small-sized electric rotating machine. To achieve this high-output power generation, it is no more necessary to have any increase in engine speed of the internal combustion engine, eventually resulting in improvement in fuel consumption.

Another power transmission control device for vehicle according to the invention includes: an electric rotating machine that is mounted on an internal combustion engine and conducts charging an on-board battery with an electric power and feeding the electric power to an electrical load; a crank pulley that is mounted on a crankshaft of the internal combustion engine and drives the electric rotating machine by power transmission means; a planetary gear mechanism consisting of a sun gear coupled to the crank pulley, a planetary gear supported on a carrier coupled to the crankshaft, and an internal gear controlled to be either a constraint state or a non-constraint state by means of an electromagnetic clutch; and control means that controls the electric rotating machine and the electromagnetic clutch. In the mentioned power transmission control device for vehicle, when the internal combustion engine is in a state of being not higher than a predetermined engine speed and, furthermore, either a remaining capacity of a battery is not more than a predetermined level or an electrical load is in a high-load state, the control means causes the planetary gear mechanism to function as a speed increasing mechanism by turning the electromagnetic clutch ON, and drives the electric rotating machine at an increasing speed.

As a result, in the same manner as claim 1, when it is necessary to supply an electric power to a large-capacity load or to rapidly charge the battery falling in an over-discharge state within a range of low speed of the internal combustion engine after the starting thereof, it is possible to generate an electric power of a high output by operating the electric rotating machine at an increasing speed, thereby enabling to meet a large-capacity load with a relatively small-sized electric rotating machine. To achieve this high-output power generation, it is no more necessary to have any increase in engine speed of the internal combustion engine, eventually resulting in improvement in fuel consumption.

DESCRIPTION OF THE PREFERRED EMBODIMENTS

Embodiment 1.

Figure 1:
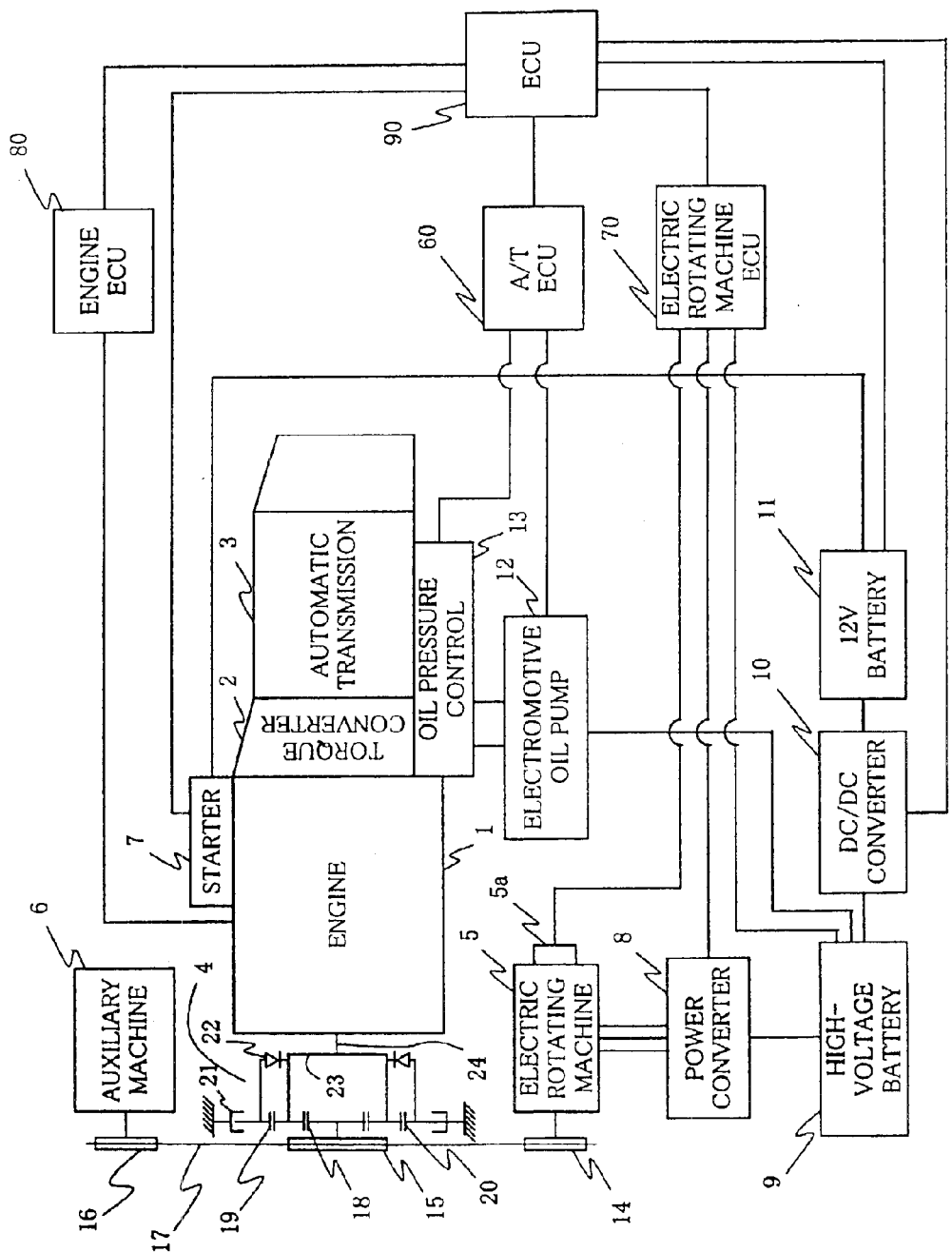
FIG. 1 is a system block diagram of a power transmission control device for vehicle according to a first preferred embodiment of the present invention.
Figure 2:
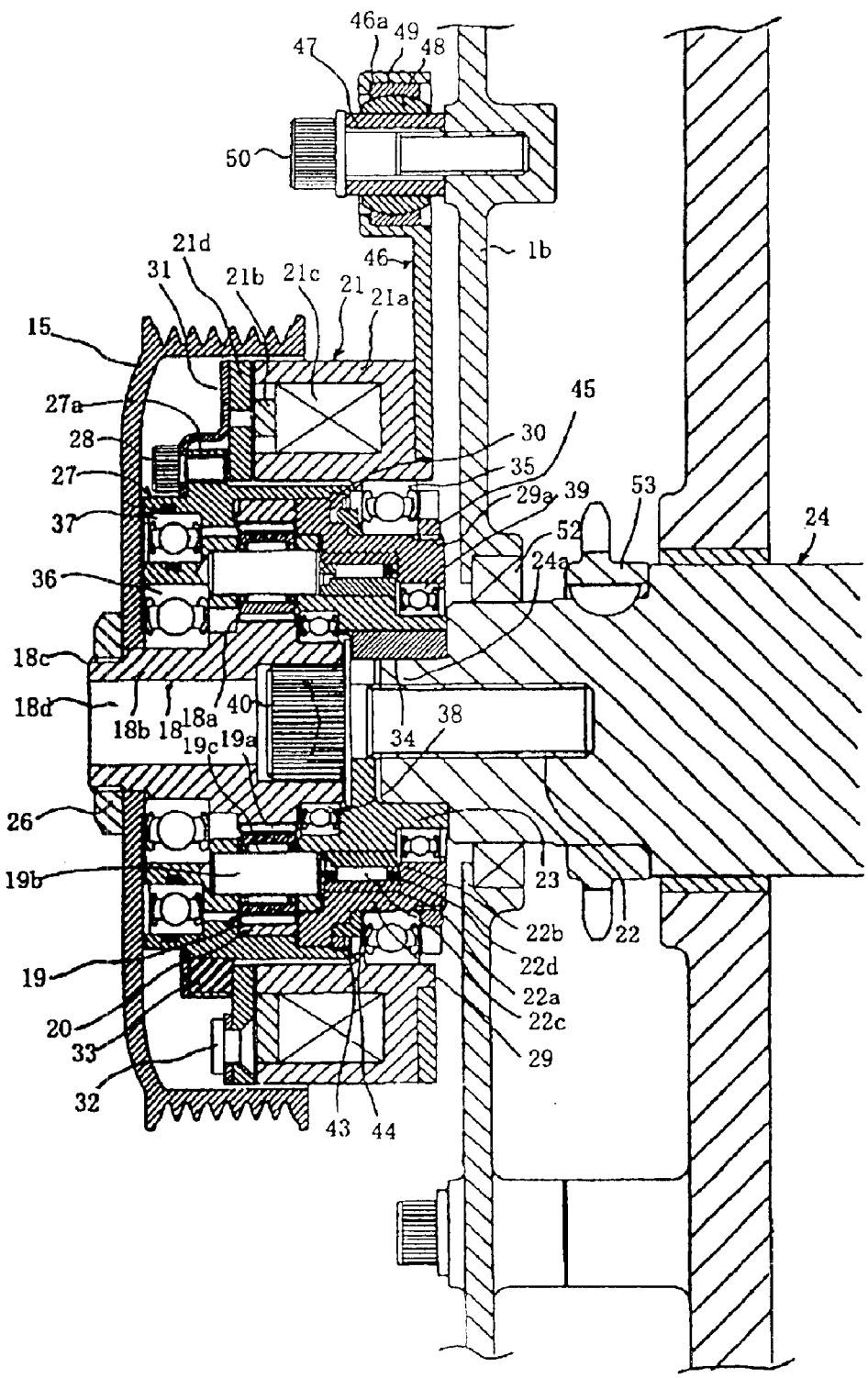
FIG. 2 is a cross sectional view showing an example of a vehicle power transmission apparatus of the power transmission control device for vehicle according to the first embodiment of the invention.
Figure 3:
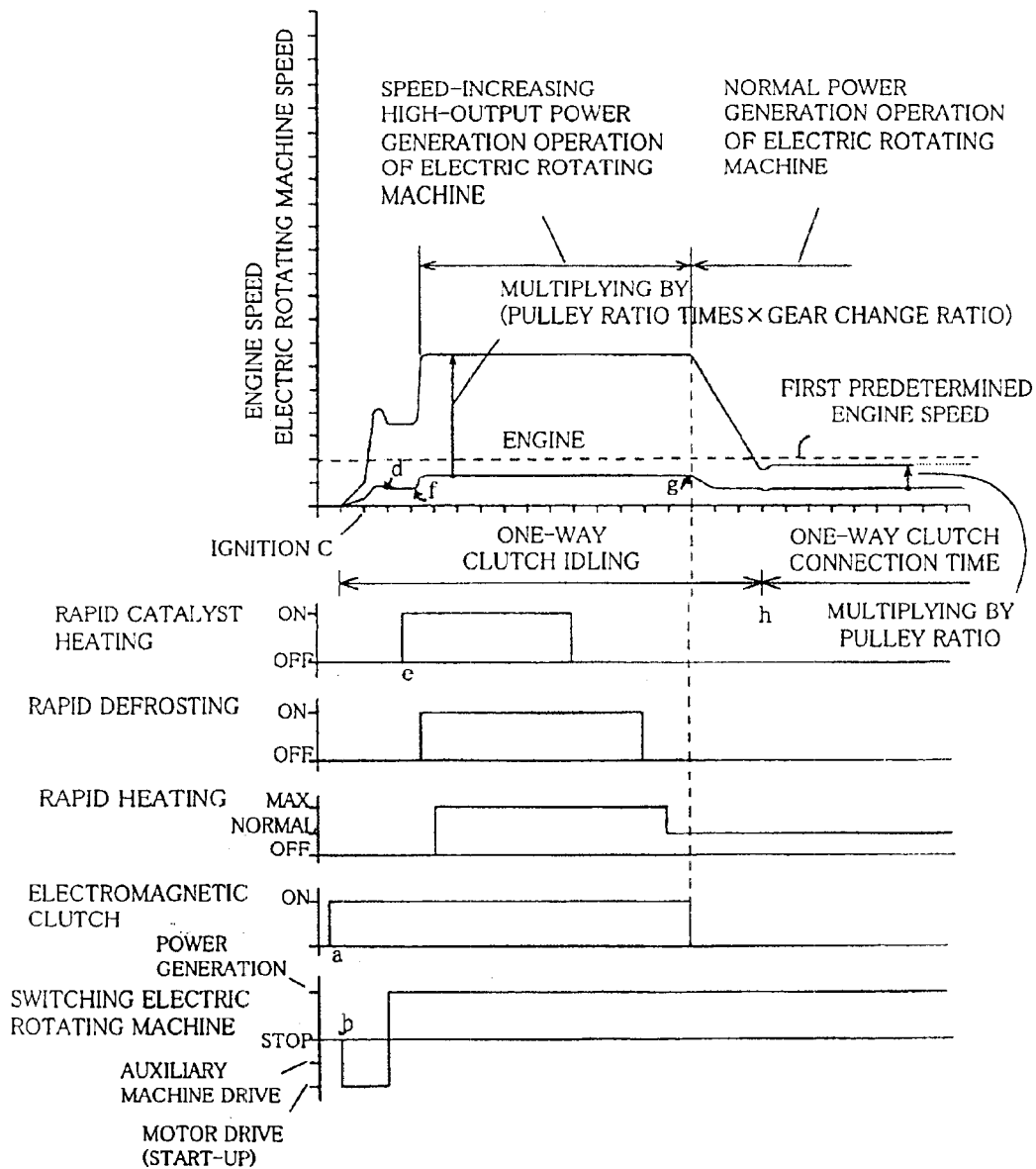
FIG. 3 is a time chart for explaining operation of the power transmission control device for vehicle according to the first embodiment of the invention.
Figure 4:
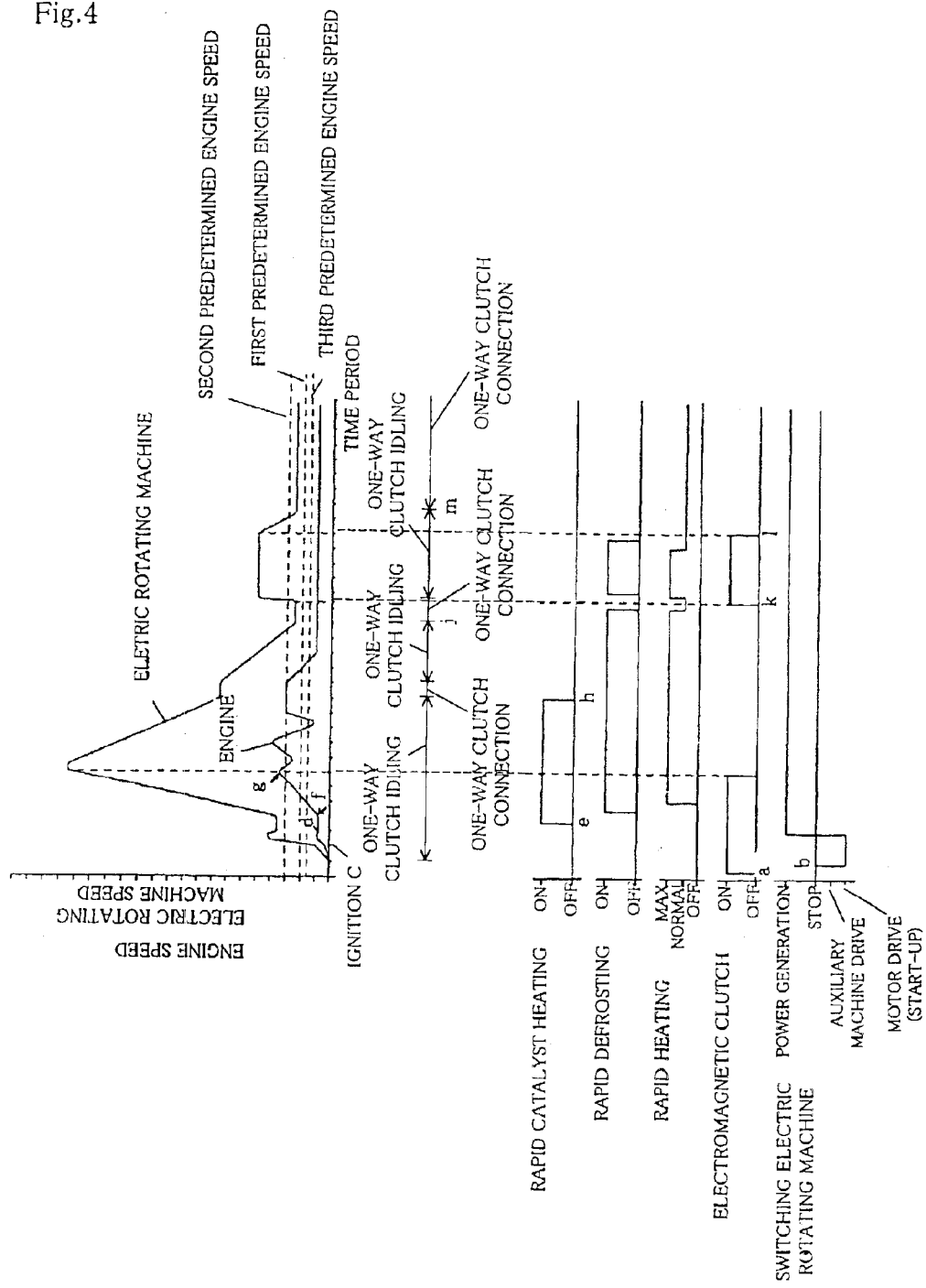
FIG. 4 is a time chart for explaining operation of the power transmission control device for vehicle according to the first embodiment of the invention.
Figure 5:
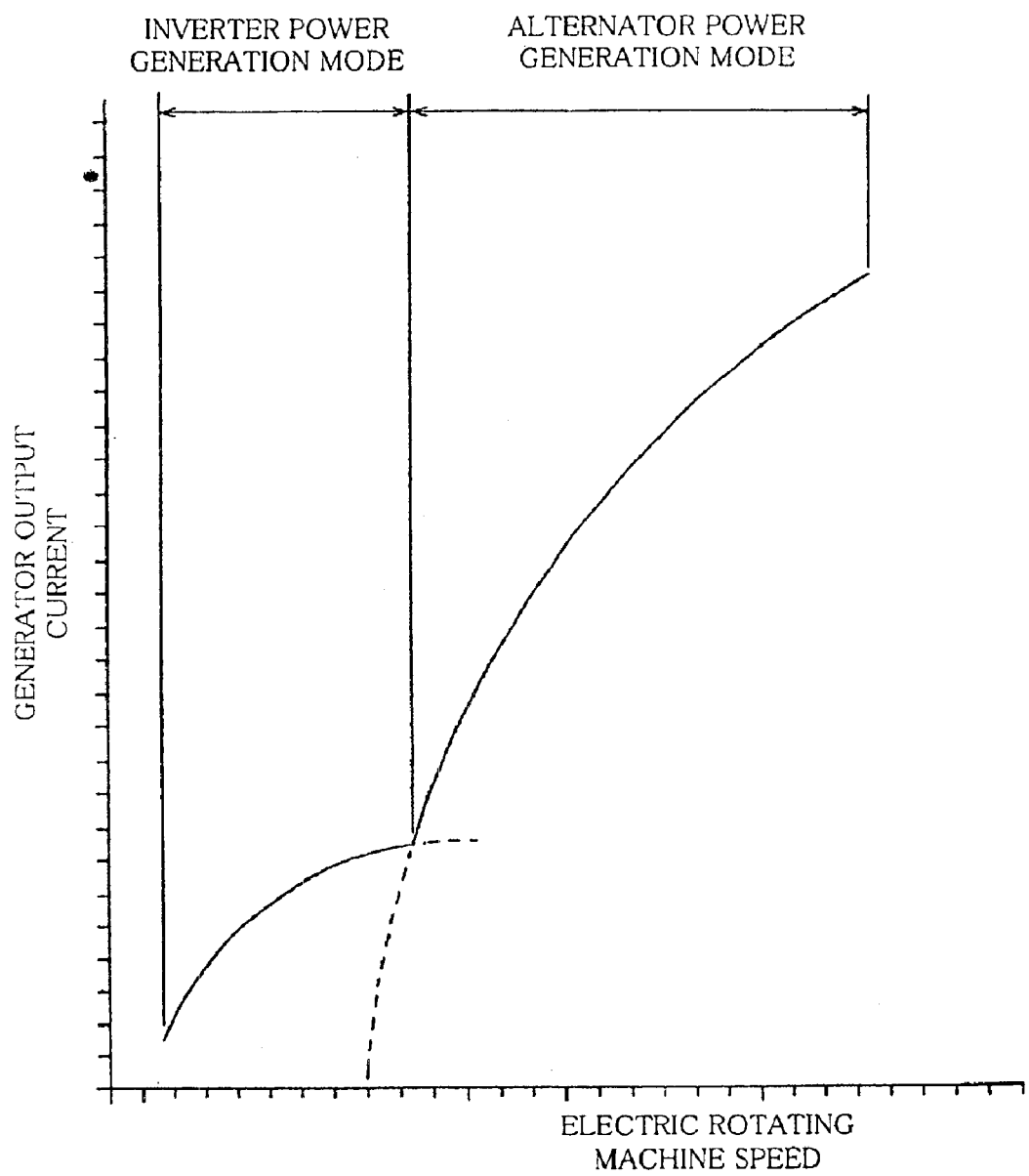
FIG. 5 is an explanatory chart for explaining a power generation mode of a generator used in the first embodiment of the invention.
Figure 6:
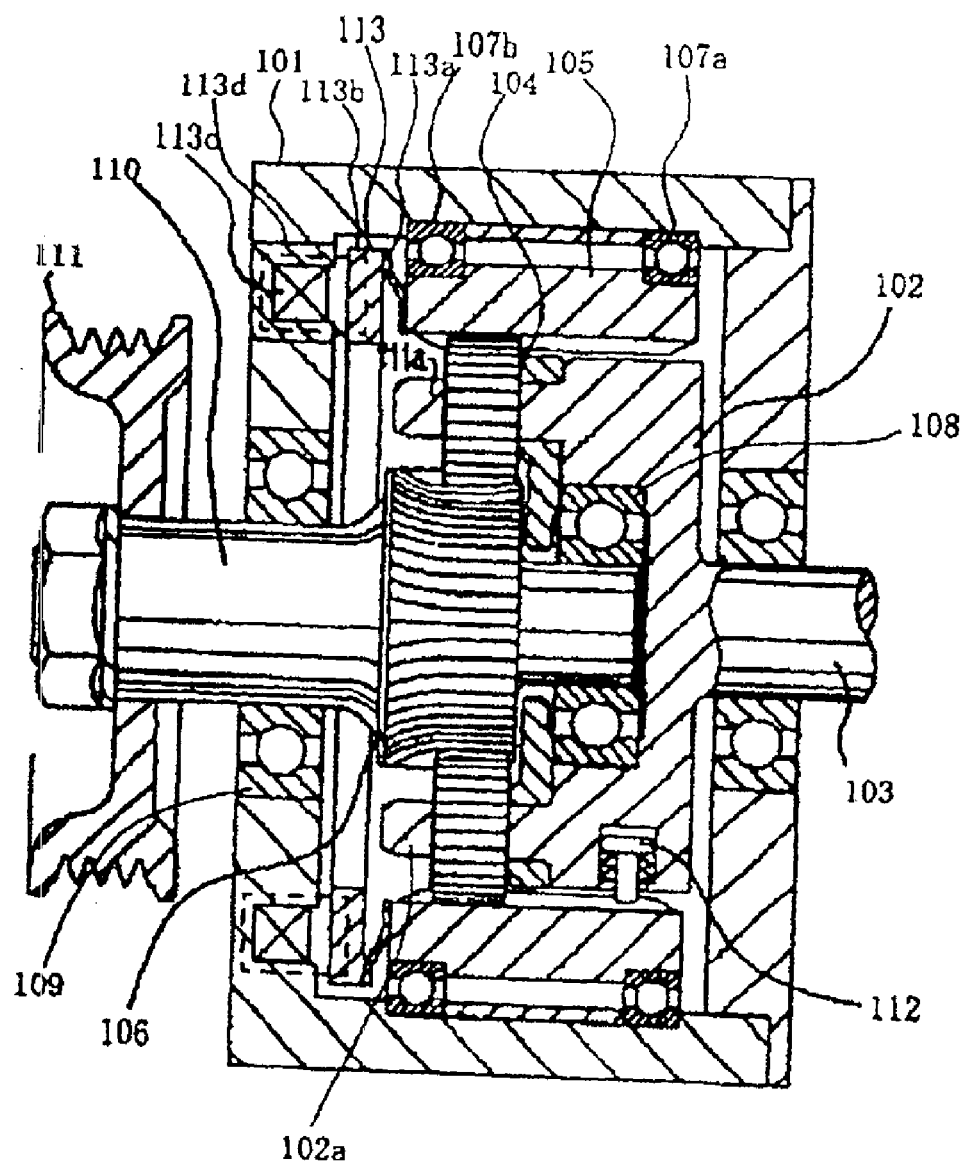
FIG. 6 is a cross sectional view of a conventional auxiliary machine drive.

FIGS. 1 through 5 are to explain constitution and operation of a power transmission control device for vehicle according to a first preferred embodiment of the present invention. FIG. 1 is a block diagram of a system including a vehicle power transmission apparatus and a control device thereof. FIG. 2 is a cross sectional view showing a specific example of a constitution of the vehicle power transmission apparatus. FIGS. 3 and 4 are time charts for explaining operation. FIG. 5 is a characteristic chart for explaining a power generation mode of a generator.

Referring now to a system block diagram of FIG. 1, reference numeral 1 designates an internal combustion engine, and this internal combustion engine 1 comprises a torque converter 2 equipped with a lockup mechanism mounted and an automatic transmission 3 (hereinafter referred to as A/T). Further, the internal combustion engine 1 is provided with a power transmission 4, an electric rotating machine 5 functioning as an electric motor and generator and an auxiliary machine 6 are connected to the internal combustion engine via the power transmission 4. During operation of the internal combustion engine 1, the internal combustion engine 1 drives the electric rotating machine 5 acting as a generator and the auxiliary machine 6, while at the starting time, the internal combustion engine 1 is driven from the electric rotating machine 5 acting as an electric motor. Furthermore, the electric rotating machine 5 is provided with a rotation sensor 5a. The internal combustion engine 1 is provided with a starter 7 in addition to the electric rotating machine 5. This starter 7 performs the first start-up of the internal combustion engine 1 when the internal combustion engine 1 continues to be stopped for a predetermined time. The starter 7 starts the internal combustion engine 1 also when a cooling water temperature is not more than a predetermined value. Except for these cases, the electric rotating machine 5 acts as an electric motor and performs a start-up operation.

When the electric rotating machine 5 starts the internal combustion engine 1, an electric power is supplied to the electric rotating machine 5 via a power converter 8 from a high-voltage battery 9. After the start-up, the high-voltage battery 9 is charged with a generated electric power via the power converter 8. The electric rotating machine 5 is a synchronous machine of three phases, and therefore the power converter 8, acting as an inverter for the start-up, converts an electric power supplied from the high-voltage battery 9 into a three-phase AC, and supplies the converted three-phase AC to the electric rotating machine 5. After the start-up, the power converter 8, acting as a rectifier, converts the three-phase AC supplied by the electric rotating machine 5 into DC and charges the high-voltage battery 9 with the DC. An electric power charged into the high-voltage battery 9 is subject to voltage conversion (voltage drop) by a DC/DC converter 10 to charge a 12V-type battery 11. Depending on an electric charge and discharge balance in the high-voltage battery 9, an electric power charged into the 12V-type battery 11 is subject to voltage conversion (voltage build-up) by the DC/DC converter 10 to charge the high-voltage battery 9. Numeral 12 designates an electromotive oil pump for supplying an oil pressure to the torque converter 2 or the A/T 3 when the internal combustion engine 1 is stopped. Numeral 13 designates an oil pressure control section for distributing a supplied oil pressure to the sections that require it.

The power transmission 4, although a specific construction thereof is described later, is comprised of: an electric rotating machine pulley 14 provided at the electric rotating machine 5; a crank pulley 15 provided at the internal combustion engine 1; an auxiliary machine pulley 16 provided at the auxiliary machine 6; power transmission means (for example, belt) 17 bridged between these pulleys; a planetary gear mechanism consisting of a sun gear 18, a planetary gear 19 and an internal gear 20; an electromagnetic clutch 21; an one-way clutch 22; and a carrier 23 for holding the planetary gear 18. The sun gear 18 is mounted on the crank pulley 15, and the carrier 23 is mounted on a crankshaft 24.

The electric rotating machine 5 functions as an electric motor at the time of starting the internal combustion engine 1, and transmits torque to the sun gear 18 via the electric rotating machine pulley 14, the crank pulley 15 provided at the internal combustion engine 1, and the power transmission means 17. At this moment, the electromagnetic clutch 21 is turned ON so that the planetary gear mechanism acts as a reduction mechanism and drives the crankshaft 24 via the planetary gear 19 and the carrier 23. After starting the internal combustion engine 1, in the case where the electromagnetic clutch 21 is turned OFF, rotation of the crankshaft 24 is transmitted to the crank pulley 15 at the same speed as that of the crankshaft 24 by the planetary gear mechanism, and drives the electric rotating machine 5 functioning as a generator and the auxiliary machine 6. On the contrary, in the case where the electromagnetic clutch 21 is ON, rotation of the crankshaft 24 is increased in speed by the planetary gear mechanism to be transmitted to the crank pulley 15, thereby the electric rotating machine 5 and the auxiliary machine 6 being driven at an increasing speed.

In the control of each member described above, it is an ECU 60 for A/T (hereinafter referred to as A/T ECU 60) that controls the electromotive oil pump 12 and the oil control means 13. It is an ECU 70 for electric rotating machine (hereinafter referred to as electric rotating machine ECU 70) that detects a charge state on the basis of rotation information from the rotation sensor 5a, temperature of the high-voltage battery 9 and charge and discharge current amount information thereof, and controls the power converter 8 and the electromagnetic clutch 21. This electric rotating machine ECU 70 also performs a function for switching control between an electric motor and a generator of the electric rotating machine 5. Further, it is an ECU 80 for internal combustion engine (hereinafter referred to as internal combustion engine ECU 80) that controls a fuel system or an ignition system of the internal combustion engine 1. It is a joint ECU 90 that integrally controls each of these ECUs, or switches starting operation of the internal combustion engine 1 from the electric rotating machine 5 to the starter 7 in accordance with the conditions.

Subsequently, a specific example of construction of the power transmission 4 is described with reference to FIG. 2. In FIG. 2, a shaft part 18b of the sun gear 18 is inserted and fitted in a center bore of the crank pulley 15, and the crank pulley 15 is cramped and secured with a nut 26 to a thread part 18c of the sun gear 18 in a state that an inside end face of the crank pulley 15 presses an inner ring of a bearing 36 fitted on the shaft part 18b of the sun gear 18. This construction forms the crank pulley 15 and the sun gear 18 into an integral structure. A bearing 38 is fitted onto an end face of the sun gear 18 on the side opposite of the bearing 36. The carrier 23 is fitted and journaled on the side of an outer ring of both bearings 36, 38 in a rotatable manner with respect to the sun gear 18.

A plurality of shafts 19b are fixed to the carrier 23, and a planetary gear 19 is rotatably journaled on the shaft 19b via a bearing 19c. Furthermore, since the carrier 23 is rotatable relative to the sun gear 18, the planetary gear 19 is constituted so as to be capable of revolving around the sun while rotating on its axis being engaged with the sun gear 18. The carrier 23 is fitted onto a joint portion 24a of the crankshaft 24, and secured to the crankshaft 24 with a bolt 40 after having been restrained from rotation by means of a key 34, thereby forming the carrier 23 and the crankshaft 24 into an integral structure.

An inner ring of a bearing 37 is fitted onto an outer circumference of an end portion on the side opposite to the crankshaft of the carrier 23. An outer circumferential bracket 27 including an internal gear 20 on an inside perimeter surface is fitted onto the outer ring of the bearing 37. An end bracket 29 secured in an axial direction by means of a retaining ring 30 is fitted and secured to the outer circumferential bracket 27. This end bracket 29 is journaled on the carrier 23 via a bearing 39. Accordingly, the internal gear 20 fixed to the outer circumferential bracket 27 is supported rotatably with respect to the carrier 23 while being engaged with the planetary gear 19.

Further, a one-way clutch 22 is provided between the inner perimeter surface of the end bracket 29 and the outer circumferential surface of the carrier 23. This one-way clutch 22 is comprised of an outer ring 22a, an inner ring 22b, a roller 22c and a retainer 22d, and constituted so as to transmit torque solely in one direction and idle in the other direction. Thus, the outer circumferential bracket 27 including the internal gear 20 and the end bracket 29 can freely rotate only in one direction with respect to the carrier 23, and rotates along with the carrier 23 in a state of being coupled thereto in the other direction. This coupled state takes place in this embodiment when the internal gear 20 rotates relatively clockwise with respect to the carrier 23 viewed from the nut 26 side.

Numeral 21 designates an electromagnetic clutch provided at a still outer circumferential portion of the outer circumferential bracket 27. This electromagnetic clutch 21 consists of a core 21a, an excitation coil 21c wound around this core 21a, an end face core 21b for forming a magnetic path, and an armature 21d provided via a gap with respect to the end face core 21b. An outer end portion of a leaf spring 31 is secured to the armature 21d by means of a rivet 32, and an inner end portion of the leaf spring 31 is secured to a flange 27a of the outer circumferential bracket 27 by means of a bolt 28. The leaf spring 31 is urged (biased) in such a direction that the armature 21d may go apart from the core 21a. Conduction to the excitation coil 21c causes the armature 21d to be attracted to the core 21a, and the outer circumferential bracket 27, accordingly the internal gear 20 is secured to the electromagnetic clutch 21 eventually to be restrained from rotation.

A buffer member 33 made of, e.g., rubber is provided between the armature 21d of the electromagnetic clutch 21 and the flange 27a of the outer circumferential bracket 27. This buffer member 33 prevents occurrence of a hitting sound generated due to collision of the armature 21d with the flange 27a at the time of turning off the electromagnetic clutch 21. Further, an outer ring of a bearing 35 is press-fitted in an inside perimeter of the core 21a. An inner ring of this bearing 35 is fitted and inserted in an outer circumference of the end bracket 29 via a spacer 43 and a washer 44, and secured to the end bracket 29 by means of a nut 45 engaging with a thread 29a provided at the end bracket 29. This spacer 43 also serves as a latch for the retaining ring 30, and the washer 44 is to adjust a gap between the armature 21d and the end face core 21b.

The core 21a of the electromagnetic clutch 21 is mounted onto a mounting plate 46 on the side opposite to the armature 21d by resistance welding, screw cramping or the like. A rotary sliding member support 49 is press-fitted in a fixing pocket, which is formed at an outer circumferential end of the mounting plate 46. Furthermore, a rotary sliding member 48 is slidably held on an inside perimeter surface of the rotary sliding member support 49, and a bush 47 is press-inserted slidably on the inner perimeter surface of the rotary sliding member 48. The bush 47 is secured to a cover bracket 1b by means of a bolt 50. A seal member 52 is provided between the cover bracket 1b and the crankshaft 24. Numeral 53, designates a sprocket for driving a camshaft not shown. In addition, the manner of controlling the electromagnetic clutch 21 by the electric rotating machine ECU 70 described above is switching between constraint and non-constraint of the internal gear 20 by ON/OFF of the electromagnetic clutch 21.

In the power transmission control device for vehicle according to the first embodiment of above construction, when conditions of an ecorun (economic running) operation (for example, idle stop) are established for a vehicle, the internal combustion engine ECU 80 stops a fuel injection to each cylinder of the internal combustion engine 1, thereby stopping the internal combustion engine 1. The internal combustion engine ECU 80 detects an idle stop, for example, in the case where a vehicle velocity is 0, a shift lever is not at a reverse-traveling position, and an accelerator is not depressed. In the case where these conditions are established and the internal combustion engine 1 is eventually stopped, the electric rotating machine 5 operates as an electric motor by control of the electric rotating machine ECU 70, drives the auxiliary machine pulley 16 via the belt 17, and drives it at a rotational speed conforming to the content of the auxiliary machine 6. The auxiliary machine 6 driven in such a way is specifically a compressor of an air conditioner or an oil pump of a power steering, for example.

On this occasion, the electromagnetic clutch 21 of the power transmission 4 is in an OFF state, and the internal combustion engine 1 is stopped, thereby the crank pulley 15 being free. More specifically, supposing that the electric rotating machine 5 rotates clockwise viewed from a principal surface side of the electric rotating machine pulley 14, the crank pulley 15 and the sun gear 18, which are connected to the electric rotating machine pulley 14 through the belt 17, also rotate clockwise. Although the planetary gear 19 rotates on its axis counterclockwise, the internal combustion engine 1 is stopped so that the carrier 23 is also stopped, and the planetary gear 19 does not revolve round the sun. Accordingly, the outer circumferential bracket 27 and the internal gear 20, which are in a state of non-constraint due to OFF of the electromagnetic clutch 21, rotate counterclockwise.

At this time, the outer ring 22a of the one-way clutch 22, which fits to the end bracket 29, rotates counterclockwise relative to the inner ring 22b thereof, which fits to the carrier 23. Therefore, the one-way clutch 22 is in an idling state, and does not inhibit rotation of the outer circumferential bracket 27 and the internal gear 20 which are coupled to the end bracket 29. In this manner, even if the internal combustion engine 1 is in a stop state, when causing the electromagnetic clutch 21 to be OFF and causing the electric rotating machine 5 to function as an electric motor, the rotation provided by the electric rotating machine 5 is transmitted only to the auxiliary machine 6, and the power transmission 4 idles thereby enabling to operate only the required auxiliary machines.

In the case of restarting the internal combustion engine 1 from the idle stop state, supposing that a stopping time of the internal combustion engine 1 is not longer than a predetermined time period, and the cooling water temperature is not lower than a predetermined value, first the electric rotating machine ECU 70 causes the electromagnetic clutch 21 of the power transmission 4 to be turned ON, subsequently causes the electric rotating machine 5 to function as an electric motor to rotate clockwise, and this rotation is transmitted to the crank pulley 15 via the belt 17. Since the electromagnetic clutch 21 is ON, the armature 21d of the electromagnetic clutch 21 is attracted to the core 21a to be in a constraint state, and the outer circumferential bracket 27 and the internal gear 20 are restrained from rotation. Therefore, the rotation having been transmitted to the crank pulley 15 is transmitted from the sun gear 18 to the planetary gear 19. Accordingly, the planetary gear 19 rotates on its axis as well as revolves round the sun, and the carrier 23 and the crankshaft 24 come to be driven at a reduced speed.

At this time, since the carrier 23 rotates clockwise, the outer ring 22a of the one-way clutch 22 that fits to the end bracket 29, comes to rotate relatively counterclockwise with respect to the inner ring thereof that fits to the carrier. Thus the one-way clutch 22 is in a state of disconnection, and runs idle. In this manner, the electric rotating machine 5 drives the internal combustion engine 1. This drive is first subject to a reduction on the basis of a pulley ratio between the electric rotating machine pulley 14 and the crank pulley 15, and further reduced by a planetary gear mechanism of the power transmission 4. Even a relatively small-sized electric rotating machine 5 can give a torque sufficient to start the internal combustion engine 1 to the crankshaft 24.

When the internal combustion engine 1 comes to an idle engine speed after having started in the mentioned manner, if it is detected that a detected temperature of the cooling water is lower than a predetermined temperature, it is required to rapidly heat a catalyst, thereby purifying an exhaust gas. If temperature inside the vehicle is detected lower than a predetermined value, it is required to operating a defroster of windows for the purpose of melting ice. Therefore, it is necessary to immediately supply an electric power to a large-capacity electrical load. Furthermore, if a remaining capacity level of a battery is low, it is necessary to conduct a rapid charge. These supplies of a large electric power should be carried out for a short time immediately after start-up, and operation should be returned to a normal power supply after passing a predetermined time. To execute such processing, the ECU 90 controls each of the ECUs 60 to 80, and performs a power generation control as shown in a time chart of FIG. 3 eventually to meet the requirements.

Referring to FIG. 3, first the electric rotating machine ECU 70 turns the electromagnetic clutch 21 ON at the point of time "a", subsequently switches the electric rotating machine 5 to function as an electric motor at the point of time "b" for start-up of the internal combustion engine. Then, the internal combustion engine ECU 80 performs ignition and a fuel supply at the following point of time "c" thereby starting the internal combustion engine 1. Upon completion of the start-up of the internal combustion engine 1 thereby the internal combustion engine 1 beginning to rotate at an idle rotational speed at the point of time "d", the electric rotating machine 5 is switched to function as a charging generator. When a switch for a rapidly heating catalyst is turned ON automatically or manually, while the electromagnetic clutch 21 continuing to be ON, the internal combustion engine ECU 80 idles up rotation of the internal combustion engine 1 within a range of not higher than a first predetermined engine speed shown in the chart at the point of time "f". This idle up is implemented on conditions that the A/T is not driven, no accelerator is operated, and the vehicle is stopping.

Since the electromagnetic clutch 21 is ON and the internal gear 20 is stationary in this state, the power transmission 4 operates as a speed increasing mechanism, and therefore the electric rotating machine 5 rotates at an increasing speed to come into a high-output power generation mode. Thus, even if the switch of the defroster or rapid heating is subsequently turned ON, the electric rotating machine 5 is capable of supplying a sufficient electric power to these loads or the battery 9. Since the electromagnetic clutch 21 is being ON from the point of time "c" to the point of time "g" in the chart, the electric rotating machine 5 acting as a generator is operated at an increasing speed on the basis of a pulley ratio between the electric rotating machine pulley 14 and the crank pulley 15, and a speed increasing ratio of the power transmission 4 possessing a planetary gear mechanism. During a time of this speed increasing operation, output of the internal combustion engine 1 is controlled in response to a speed-increasing high-output power generation mode, and controlled so as to operate, thereby holding an engine speed and torque.

At the point of time "g", the electromagnetic clutch 21 is switched to OFF, and the internal gear 20 is released from the constraint state. When the internal gear 20 becomes rotatable, the power transmission 4 does not operate at the increasing speed any more. The electric rotating machine 5, however, continues to rotate at a speed higher than that at the pulley ratio due to inertia, and crank pulley 15 and the sun gear 18 are driven reversely to rotate at a higher speed than that of the crankshaft 24 or the carrier 23. Since this sun gear 18 rotates clockwise, the outer peripheral bracket 27, the end bracket 29 and the internal gear 20 come to rotate relatively counterclockwise with respect to the carrier 23, resulting in idling of the one-way clutch 22. When rotational speed of the electric rotating machine 5 decreases gradually, the one-way clutch 22 is brought into a connection state. In this manner, the operation returns to a normal power-generation state in which torque is transmitted to the crank pulley 15 from the crankshaft 24, and this moment is the point of time "g" in the chart.

As described above, the electromagnetic clutch 21 is being ON from the point of time "c" to the point of time "g", and a period from the point of time "f" to the point of time "g" corresponds to the operation of the electric rotating machine 5 at an increasing speed. The point of time "g", however, can be set on the detection of switching off a rapid catalyst heating or rapid heating. Further, a period up to the point of time "g" can be set on the basis of, e.g., the stopping time period before starting the internal combustion engine, and a cooling water temperature at the time of start-up. Furthermore, the first predetermined engine speed at the time of idle up can be controlled to be such an engine speed as conforming to a required electric energy that is calculated on the basis of amount of electrical load for rapid catalyst heating, etc., remaining capacity of the battery 9, cooling water temperature of the internal combustion engine 1, temperature inside the vehicle, and the like.

In the case where an accelerator operation is carried out after start-up, rotation of the internal combustion engine 1 and that of the electric rotating machine 5, which is increased in speed, come to rise. At this time, however, a control is carried out in such manner as shown in a time chart of FIG. 4. First, the electric rotating machine ECU 70 turns the electromagnetic clutch 21 ON at the point of time "a" in FIG. 4 in the start-up, and subsequently switches the electric rotating machine 5 to function as an electric motor at the point of time "b" thereby beginning the start-up of the internal combustion engine. At the following point of time "c", the internal combustion engine. ECU 80 performs an ignition and fuel supply to start the internal combustion engine 1, and the electric rotating machine 5 is switched to function as a generator when the internal combustion engine 1 performs an idle rotation at the point of time "d". Furthermore, a switch for rapid catalyst heating is turned ON automatically or manually at the point of time "e". When an accelerator is depressed at the point of time "f" while the electromagnetic clutch 21 continuing to be ON, the internal combustion engine 1 and the electric rotating machine 5 connected in a speed up manner are rapidly increased in rotational speed.

Although the electric rotating machine 5 remain in a high-output power generation mode, when engine speed of the internal combustion engine 1 exceeds a second predetermined engine speed higher than the first predetermined engine speed shown in FIG. 3, the electric rotating machine ECU 70 detects the exceeding speed with an output from the rotation sensor 5a, and turns the electromagnetic clutch 21 OFF in order to prevent the electric rotating machine 5 from over-rotation. Accordingly, the electric rotating machine 5 gradually slows down its rotation in accordance with balance between inertia, its own output and load of the auxiliary machine 6 connected via the belt 17. At this time, the one-way clutch 22 is in an idling state. The one-way clutch 22, however, is brought into connection owing to decrease in rotation of the electric rotating machine 5, and rotates at a speed determined on the basis of a pulley ratio with respect to the internal combustion engine 1 at the point of time "h". (In FIG. 4, the point of time "h" indicates switching off the rapid catalyst heating. However, connection of the one-way clutch 22 is irrelative to this switching off.)

Further, when engine speed of the internal combustion engine is sharply dropped due to no operation of the accelerator, the one-way clutch idles again and then is brought into connection again at the point of time "j" when rotational speed of the electric rotating machine 5 has decreased. When a power generation output comes short owing to a high load such as rapid heating, the electric rotating machine ECU 70 turns the electromagnetic clutch 21 ON again at the point of time "k" on condition that engine speed of the internal combustion engine is not higher than a third predetermined engine speed lower than the first predetermined engine speed. Thus, the electric rotating machine 5 is brought into a speed-increasing high-output power generation mode. At this time, if the electromagnetic clutch 21 is turned ON in a state that the electric rotating machine 5 remains in high-load, a rapid rotational change of the internal combustion engine 1 impairs drivability, or damages the electromagnetic clutch 21. Therefore, the ECU 90 once causes a part of electrical loads to be OFF and reduced before turning the electromagnetic clutch 21 ON, then turns the electromagnetic clutch 21 ON, and thereafter causes the electrical loads to be ON in a predetermined sequential order. In addition, the ECU 90 conducts the like control for the auxiliary machine 6.

Upon completion of the use of a high load such as rapid heating, it is no more necessary to generate any electric power in the speed-increasing high-output power generation mode, the electromagnetic clutch 21 is turned OFF at the point of time "l" in the chart to return to the normal power generation mode. In addition, the electric rotating machine ECU 70 turns the electromagnetic clutch 21 ON again at the point of time "k" on conditions that engine speed of the internal combustion engine is decreased to be not higher than the third predetermined engine speed shown in FIG. 4; and that a state, in which absolute value of rotational acceleration (acceleration and deceleration) of the internal combustion engine 1 is not larger than a predetermined value, continues for a predetermined time. So long as absolute value of a rotational acceleration is not smaller than a predetermined value even if an engine speed is decreased to not higher than the third predetermined engine speed, or so long as the state, in which absolute value of a rotational acceleration is not larger than a predetermined value, does not continue for a predetermined time, even if such a state takes a place, the electromagnetic clutch 21 still remains OFF. This control is performed in order to prevent occurrence of hunting or deterioration in endurance due to frequent ON/OFF of the electromagnetic clutch 21 due to the operation in which an engine speed of the internal combustion engine largely changes within a range of not higher than the third engine speed.

To prevent shock occurring at the time of switching the electromagnetic clutch 21 from OFF to ON during operation of the internal combustion engine 1, it is preferable that the electric rotating machine 5 is preliminarily switched from the function as a generator the function as an electric motor. Then the electromagnetic clutch 21 is brought into connection in the state of synchronizing with a rotational speed under the speed increasing condition obtained by multiplying the rotational speed by a factor of "engine speed of an internal combustion engine×pulley ratio×change gear ratio of a planetary gear mechanism". A certain time is required for completing such synchronization. However, when difference between this rotational speed of the electric rotating machine 5 and an engine speed determined by considering the above-mentioned speed increasing ratio is reduced to the extent of not more than ±30%, the shock at the time of connection can be reduced to a problem-free level, and therefore connection can be performed in a short time. In addition, absolute value of the second predetermined engine speed, the third predetermined engine speed and the rotational acceleration of the internal combustion engine 1 can be set on the basis of any or a plurality of the following detected signal information. The signal information includes amount of an electrical load such as rapid catalyst heating, remaining capacity of the battery 9, cooling water temperature of the internal combustion engine 1, temperature inside the vehicle, vehicle speed, traffic jam information and the like.

In the operation of FIG. 4 described above, depression of the accelerator at the point of time "f" indicates that a vehicle enters a departure state after the internal combustion engine 1 has been started. The OFF operation of the electromagnetic clutch 21 at the point of time "g" is implemented under the conditions that, for example, A/T of the vehicle is in a drive state, engine speed of the internal combustion engine is in acceleration state as shown in the chart, vehicle speed is not lower than a predetermined value, and engine speed of the internal combustion engine 1 exceeds the second predetermined engine speed. The OFF operation of the electromagnetic clutch 21 can be set so as to prevent over-rotation due to idling even if a vehicle is not in a traveling state.

FIG. 5 shows that the electric rotating machine 5 includes two types of power generation modes when functioning as a generator. That is, the electric rotating machine 5 has functions of an inverter power generation mode and an alternator power generation mode (or normal power generation mode). In the inverter power generation mode, a compensation current, which is phase-controlled by an inverter function of the power converter 8, is supplied to an armature coil of the electric rotating machine 5 from the battery 9. In this manner, the magnetic field becomes more intense, thereby intensifying output at a low-speed rotation. The alternator power generation mode is a normal power generation mode in which the power generation is conducted by control of a magnetic field current.

An inverter that supplies a phase-controlled compensation current generates an electric power, changing contents of a PWM control of the inverter that is used for causing the electric rotating machine 5 to function as an electric motor. Thus, the electric rotating machine 5 can possess the mentioned two power generation modes. Accordingly, to augment an output at a low-speed rotation of the internal combustion engine 1, the inverter power generation mode and the speed-increasing high-output power generation mode can be used. However, because power generation efficiency in the inverter power generation mode is lower than in the alternator power generation mode, the alternator power generation mode is used for augmenting the output in the speed-increasing high-output power generation mode. In addition, the foregoing description is made on the assumption that the electric rotating machine 5 includes functions as an electric motor as well as an generator. The invention can be applied to the case where the electric rotating machine has only one function as a generator.

What is claimed is:

1. A power transmission control device for vehicle comprising:

an electric rotating machine mounted on an internal combustion engine and functions as an electric motor and as a generator;

a crank pulley mounted on a crankshaft of said internal combustion engine and drives said electric rotating machine by power transmission means;

a planetary gear mechanism comprising a sun gear coupled to said crank pulley, a planetary gear supported on a carrier coupled to said crankshaft, and an internal gear operated in either a constraint state or a non-constraint state by means of an electromagnetic clutch; and control means that controls said electric rotating machine and said electromagnetic clutch;

wherein, upon start of said internal combustion engine, said control means turns said electromagnetic clutch ON thereby operating said planetary gear mechanism as a reduction mechanism, and drives said internal combustion engine using said electric rotating machine as an electric motor; and wherein, when said internal combustion engine operates not higher than a predetermined engine speed and, either a remaining capacity of a battery, which is electrically supplied from said electric rotating machine, is not more than a predetermined level or an electrical load is in a high-load state after said internal combustion engine has started, said control means operates said planetary gear mechanism as a speed increasing mechanism by maintaining the ON state of said electromagnetic clutch, and drives said electric rotating machine, operating as a generator, at an increasing speed.

2. The power transmission control device for vehicle according to claim 1, further comprising an auxiliary machine shaft through which an auxiliary machine such as oil pump is connected to said internal combustion engine; and when said electromagnetic clutch is turned ON, said crank pulley drives said electric rotating machine and said auxiliary machine shaft at an increased speed, and when said electromagnetic clutch is turned OFF when said internal combustion engine is stopped, said auxiliary machine shaft is driven by said electric rotating machine.

3. The power transmission control device for vehicle according to claim 1, wherein a power generation mode of said electric rotating machine includes an inverter power generation mode in which a phase-controlled compensation current is supplied from an inverter, and a normal power generation mode in which a target voltage is outputted by control of a magnetic field current; and when said electric rotating machine is driven at an increased speed, power generation is conducted in the normal power generation mode.

4. The power transmission control device for vehicle according to claim 1, wherein a high-load state of said electrical load is continued only for a predetermined time after start of said internal combustion engine; and said electric rotating machine is driven at an increased speed during the high-load state.

5. The power transmission control device for vehicle according to claim 4, wherein a predetermined time when said high-load state continues, is based on a stopping time until start-up of said internal combustion engine, and a cooling water temperature at the time of start-up.

6. The power transmission control device for vehicle according to claim 1, wherein said internal combustion engine is operated to have an engine speed and torque conforming to a speed increased drive while said electric rotating machine is driven at the increased speed.

7. The power transmission control device for vehicle according to claim 6, wherein detection of no accelerator operation and vehicle speed is 0 when the transmission means of a vehicle is not driven, engine speed of said internal combustion engine is operated not to be higher than a first predetermined engine speed.

8. The power transmission control device for vehicle according to claim 7, wherein said first predetermined engine speed is based on an amount of said electrical load, remaining capacity of said battery, cooling water temperature of said internal combustion engine, and temperature inside the vehicle.

9. The power transmission control device for vehicle according to claim 1, wherein upon detection that the engine speed of said internal combustion engine has reached a second predetermined engine speed, and the speed increasing drive of said electric rotating machine is released when the transmission means of the vehicle is being driven, engine speed of said internal combustion engine is accelerated, and vehicle speed is not lower than a predetermined value.

10. The power transmission control device for vehicle according to claim 9, wherein said second predetermined engine speed is based on a plurality of signals regarding the amount of said electrical load, remaining capacity of said battery, cooling water temperature of said internal combustion engine, temperature inside the vehicle, vehicle speed and traffic jam information.

11. The power transmission control device for vehicle according to claim 9, wherein said electric rotating machine is again driven at an increased speed when an engine speed of said internal combustion engine exceeds said second predetermined engine speed, resulting in release of the speed increasing drive of said electric rotating machine and, thereafter, engine speed of said internal combustion engine is reduced to not higher than a third predetermined engine speed.

12. The power transmission control device for vehicle according to claim 11, wherein said third predetermined engine speed is based on a plurality of signals regarding the amount of said electrical load, remaining capacity of said battery, cooling water temperature of said internal combustion engine, temperature inside the vehicle, vehicle speed and traffic jam information.

13. The power transmission control device for vehicle according to claim 11, wherein said electric rotating machine is again driven at an increasing speed when an absolute value of a rotational acceleration of said internal combustion engine is lower than a predetermined value for a predetermined time period when an engine speed of said internal combustion engine exceeds said second predetermined engine speed resulting in release of the speed increasing drive of said electric rotating machine and, thereafter, engine speed of said internal combustion engine is reduced to not higher than a third predetermined engine speed.

14. The power transmission control device for vehicle according to claim 13, wherein a predetermined value of an absolute value of a rotational acceleration of said internal combustion engine is based on a plurality of signals regarding the amount of said electrical load, remaining capacity of said battery, cooling water temperature of said internal combustion engine, temperature inside the vehicle, vehicle speed and traffic jam information.

15. The power transmission control device for vehicle according to claim 11, wherein said electric rotating machine is switched to function as an electric motor, and proceeds to a speed increasing drive state when a rotational speed of said electric rotating machine is driven up to a target rotational speed substantially synchronized with the engine speed of said internal combustion engine including a pulley ratio and a speed increasing ratio of said planetary gear mechanism.

16. The power transmission control device for vehicle according to claim 15, wherein said target rotational speed is controlled so as to be different by not more than 30% from an engine speed of said internal combustion engine including said pulley ratio and said speed increasing ratio of said planetary gear mechanism.

17. The power transmission control device for vehicle according to claim 11, wherein when said electric rotating machine is again driven at an increasing speed, it is controlled such that said electric rotating machine proceeds to a speed increasing drive after interrupting the auxiliary machines driven via said planetary gear mechanism and a part of electrical loads of said electric rotating machine; and after having shifted to said speed increasing drive, the interrupted auxiliary machines and electrical loads are returned in a predetermined order.

18. A power transmission control device for vehicle comprising:

an electric rotating machine mounted on an internal combustion engine and charges an on-board battery with an electric power and feeds an electric power to an electrical load;

a crank pulley mounted on a crankshaft of said internal combustion engine and drives said electric rotating machine by power transmission means;

a planetary gear mechanism comprising a sun gear coupled to said crank pulley, a planetary gear supported on a carrier coupled to said crankshaft, and an internal gear operated in either a constraint state or a non-constraint state by means of an electromagnetic clutch; and control means that controls said electric rotating machine and said electromagnetic clutch;

wherein, said control means operates said planetary gear mechanism as a speed increasing mechanism by turning said electromagnetic clutch ON, and drives said electric rotating machine at an increasing speed when said internal combustion engine operates not higher than a predetermined engine speed and, either a remaining capacity of a battery is not more than a predetermined level or an electrical load is in a high-load state.

19. A power transmission control device comprising:

an electric rotating machine mounted on an internal combustion engine, the electric rotating machine functioning as an electric motor and as a generator;

a crank pulley mounted on a crankshaft of said internal combustion engine;

a planetary gear mechanism comprising a sun gear coupled to the crank pulley, a planetary gear supported on a carrier coupled to the crankshaft, and an internal gear controlled to be in a constraint state or a non-constraint state by an electromagnetic clutch; and a control circuit that turns the electromagnetic clutch ON, upon start of the internal combustion engine, thereby causing the planetary gear mechanism to operate as a reduction mechanism, and drives the internal combustion engine using the electric rotating machine as an electric motor; and the control circuit operates the planetary gear mechanism to perform as a speed increasing mechanism by maintaining the ON state of the electromagnetic clutch, and drives the electric rotating machine as a generator at an increasing speed, when a speed of the internal combustion engine is not higher than a predetermined engine speed and, either a remaining capacity of a battery, which is electrically supplied from the electric rotating machine, is not more than a predetermined level or an electrical load is in a high-load state after the internal combustion engine has been started.

20. A power transmission control device comprising:

an electric rotating machine mounted on an internal combustion engine that charges an on-board battery with an electric power, and feeds an electric power to an electrical load;

a crank pulley mounted on a crankshaft of the internal combustion engine and drives the electric rotating machine by power transmission means;

a planetary gear mechanism comprising a sun gear coupled to the crank pulley, a planetary gear supported on a carrier coupled to the crankshaft, and an internal gear operated in either a constraint state or a non-constraint state by an electromagnetic clutch; and a control circuit that operates the planetary gear mechanism to perform as a speed increasing mechanism by turning the electromagnetic clutch ON, and drives the electric rotating machine at an increasing speed when a speed of the internal combustion engine is not higher than a predetermined engine speed and, either a remaining capacity of a battery is not more than a predetermined level or an electrical load is in a high-load state.

* * * * *